United States Patent
Obliger

(10) Patent No.: US 12,075,939 B2
(45) Date of Patent: Sep. 3, 2024

(54) BEVERAGE MACHINE WITH A CONTROLLED OUTFLOW APERTURE

(71) Applicant: SOCIETE DES PRODUITS NESTLE S.A., Vevey (CH)

(72) Inventor: Nicolas Obliger, Franey (FR)

(73) Assignee: Societe des Produits Nestle S.A., Vevey (CH)

( * ) Notice: Subject to any disclaimer, the term of this patent is extended or adjusted under 35 U.S.C. 154(b) by 840 days.

(21) Appl. No.: 16/980,152

(22) PCT Filed: Mar. 13, 2019

(86) PCT No.: PCT/EP2019/056264
§ 371 (c)(1),
(2) Date: Sep. 11, 2020

(87) PCT Pub. No.: WO2019/175228
PCT Pub. Date: Sep. 19, 2019

(65) Prior Publication Data
US 2021/0007534 A1    Jan. 14, 2021

(30) Foreign Application Priority Data

Mar. 14, 2018  (EP) ..................... 18161841
Dec. 20, 2018  (EP) ..................... 18214459

(51) Int. Cl.
*A47J 31/06*    (2006.01)
*A47J 31/36*    (2006.01)

(52) U.S. Cl.
CPC ....... *A47J 31/0621* (2013.01); *A47J 31/3628* (2013.01); *A47J 31/3633* (2013.01)

(58) Field of Classification Search
CPC . A47J 31/0621; A47J 31/3628; A47J 31/3633
See application file for complete search history.

(56) References Cited

FOREIGN PATENT DOCUMENTS

| DE | 3127851 | 2/1983 |
| NL | 7706110 | 12/1978 |

(Continued)

OTHER PUBLICATIONS

Börner, DE 31 27 851, Machine Translation, Feb. 1983 (Year: 1983).*

(Continued)

*Primary Examiner* — Drew E Becker
*Assistant Examiner* — Chaim A Smith
(74) *Attorney, Agent, or Firm* — K&L Gates LLP

(57) ABSTRACT

A machine for preparing a beverage from an ingredient has: an extraction seat, an inlet arrangement for guiding water into the seat and a dispensing arrangement for guiding beverage out of the seat. The dispensing arrangement has a face, formed by a beverage guide structure for guiding a total flow of beverage out of a total guide exit, delimiting a downstream part of the seat. The guide structure is associated with a flow control device, having an obstruction portion and one or more control sides, configured to control the flow of beverage. The control sides suitable to delimit from the obstruction portion a passage that the total flow of beverage is passed through. The obstruction portion and the control side(s) are operable over the beverage guide structure to change a position, size and/or shape of the obstructed and unobstructed portion of the total guide entry and/or exit.

11 Claims, 3 Drawing Sheets

(56) References Cited

FOREIGN PATENT DOCUMENTS

| | | |
|---|---|---|
| RU | 2010139872 A | 4/2012 |
| WO | 2012072758 | 6/2012 |
| WO | 2012072766 | 6/2012 |

OTHER PUBLICATIONS

Russian Office Action for Appl No. 2020132031 dated Jul. 5, 2022.

\* cited by examiner

BEVERAGE MACHINE WITH A CONTROLLED OUTFLOW APERTURE

CROSS REFERENCE TO RELATED APPLICATIONS

The present application is a National Stage of International Application No. PCT/EP2019/056264, filed on Mar. 13, 2019, which claims priority to European Patent Application No. 18161841.4, filed on Mar. 14, 2018 and European Patent Application No. 18214459.2, filed Dec. 20, 2018, the entire contents of which are being incorporated herein by reference.

FIELD OF THE INVENTION

The field of the invention pertains to beverage preparation machines provided with a particular extraction arrangement of capsules containing an ingredient of the beverage to be prepared.

For the purpose of the present description, a "beverage" is meant to include any human-consumable liquid substance, such as tea, coffee, hot or cold chocolate, milk, soup, baby food, etc . . . . A "capsule" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

The preparation of beverage by extraction of an extractible ingredient, such as a brewable ingredient e.g. roast-and-ground coffee and/or tea, in particular contained in a portioned container such as a capsule, a pod or a sachet, is well known.

EP0512468 relates to a capsule with a cup-shaped body and a tearable beverage outlet membrane. The membrane is generally a thin aluminium membrane that tears against a tearing extraction plate of a beverage extracting device such as described in EP0512470.

EP0512470 relates to a system for extracting a coffee using a beverage extraction unit with a tearing extraction plate comprising multiple raised elements and channels in-between (called a "flow grille and relief surface element") which is adapted to receive a sealed capsule, to introduce water under pressure via a water injector into the capsule, to deform the outlet membrane or cover (e.g. an aluminium membrane) and to tear it under the effect of pressure of the liquid rising in the capsule to allow the beverage to be released from the capsule.

EP0602203 relates to a sealed flexible sachet in the form of an individual portion adapted to be extracted under pressure containing at least one powdered substance for the preparation of a beverage such as roast-and-ground coffee; the sachet comprising two identical flexible sheets of circular, oval or polygonal shape, which provide between one another a space for the substance and are sealed over their periphery so that the sachet is substantially symmetrical with respect to its plane of sealing, the sachet being opened under the effect of the increase in pressure in the sachet when the extraction fluid is injected.

EP0870457 relates to an extraction unit similar to as EP0512470, but adapted for a closed impermeable sachet containing coffee substance such as described in EP0602203. The device comprises an upper member comprising means intended to perforate the upper surface of the sachet and permit introduction of water into the sachet, a lower member which has a receptacle for accommodation of the capsule and raised and hollow portions; wherein the extraction surface of the sachet is drawn progressively and locally against the raised and hollow portions; the extraction surface tearing in multiple locations according to a path which is predetermined by the location of the raised and hollow portions and reaching its rupture tension there, in order to permit the flow of the liquid after extraction. The lower portion generally comprises flow apertures to permit the beverage to flow there-through. The raised and hollow portions are preferably under the form of truncated pyramids separated by a network of channels.

Hence, handy prior art beverage extraction systems utilize an exchangeable capsule, e.g. rigid capsule, sachet or flexible pod, comprising a tearable beverage outlet membrane, e.g. a thin aluminium foil, which can be torn only when a sufficient deformation of this membrane has occurred against the raised elements of the tearing plate. The tearing generally occurs at the edges of the raised elements which are generally multiple small truncated pyramids or rectilinear ridges. The tearing results in the creation of small orifices along the edges of these raised elements. These orifices are relatively small (e.g. 0.1-1.0 mm long and 0.1-0.3 mm wide) and generally the outlet membrane at least partially conforms to the top and upper side of the raised elements so reducing even more the flow opening area. As a result, the pressure drop is relatively high at this interface. Furthermore, filtering of the coffee particle occurs at this confined interface which is an advantage since no additional filter is necessary inside the capsule. This geometry of extraction therefore corresponds to what can be generally called a geometry of an extraction plate with raised elements in the present application. The flow of beverage is then collected in the channels and drained through small openings of well-defined dimensions in the channels.

In the known system of the prior art, the flow rate and pressure are dictated by the intrinsic properties of the capsule and by the performance of the pump.

The backpressure highly depends on the degree of compaction of the ground coffee in the capsule. For a same coffee blend, the variability of pressure can be very high. In particular, for certain coffee blends, in particular, in the low particle size, the pressure may vary from 5 to 15 bar.

Whereas the ingredient extraction space, e.g. with a capsule and/or an extraction chamber is usually symmetrical along the general flow direction, enabling easy handling of the ingredient, it may be advantageous to obtain an adjusted flow at extraction that is such as to obtain or increase certain extraction effects, e.g. crema formation or intensity of the extraction.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluent liquid, e.g. water, may be mixed with such ingredient to form the beverage.

Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The invention relates to a machine for preparing a beverage from an ingredient, such as an ingredient contained within a capsule that is provided with an outlet membrane.

The capsule can be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

The machine includes an extraction unit that has an extraction unit such as a capsule extraction seat, an inlet arrangement for guiding water into the seat and a dispensing arrangement for guiding beverage out of the seat.

Examples of ingredient extraction seats, e.g. extraction chambers, are disclosed in EP 1767129, WO 2008/037642, WO 2012/025258, WO 2012/025259, WO 2013/026843, WO 2013/127476, WO 2014/056641, WO 2014/096122, WO 2014/096123, WO 2015/155144 and WO 2015/155145.

The machine has a dispensing arrangement including a face delimiting a downstream part of the seat. The face is formed by a beverage guide structure, such as plate-like or sheet-like wall e.g. a disk-like member, having a beverage guide for guiding a total flow of beverage from the seat via a total guide entry, through the wall, out of a total guide exit towards a dispensing area via a beverage outlet.

The beverage guide may be made of several distinct and/or interconnected passages with inlets and outlets at the extremities of the beverage guide, the passages guiding the above mentioned total flow of beverage through the beverage guide structure. The inlets and outlets of the passages form cumulatively the total guide entry and the total guide exit.

Generally speaking, the beverage guide can be formed of at least one of: flow-through passages formed by a reticulated and/or foraminate and/or porous structure; and one or more flow-through holes.

The dispensing area may be delimited by a support for supporting a user-recipient, e.g. a cup or mug. For instance, the support is a support device that is connected an outside machine housing and/or a machine frame, or the support device is external to such machine, for example the machine itself is placed for dispensing the beverage. Typically, the external support device has a generally horizontal surface for placing such machine, the device being for instance a table or a shelf.

The user-recipient support can be: associated with a drip tray e.g. a drip tray supporting the support; and/or movable relative to the housing vertically under the outlet and/or away from under a dispensing outlet for enabling a placement of user-recipients of different heights under the outlet.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198710, EP 2014198712 and EP 2014198715.

The machine may have a drop stop arrangement between the seat and the beverage dispensing area. Examples of drop stops are disclosed in WO 2006/050769, WO 2012/072758, WO 2013/127907, WO 2016/050657, WO 2016/083488, WO 2018/069266 and EP2017208722.3.

The guide structure is associated with a flow control device configured to control the flow of beverage guided along the beverage guide.

The flow control device has an obstruction portion, such as a portion that is at least substantially beverage impervious, extending adjacent the beverage guide structure so as to obstruct at least a portion of the total guide entry and/or exit to prevent or inhibit the passage of beverage through such obstructed guide portion.

The flow control device has one or more control sides suitable to delimit from the obstruction portion a passage through which is passed the total flow of beverage passing through a non-obstructed portion of the total guide entry and/or exit, the non-obstructed portion being adjacent the obstructed portion.

The obstruction portion and the control side(s) are operable over the beverage guide structure so as to change a relative position and/or a relative size and/or a shape of the obstructed portion and the unobstructed portion of the total guide entry and/or exit. The obstruction portion and the control side(s) may be able to be brought selectively in a number of different configurations in terms of relative size and/or relative position and/or shape, for instance a number of at least two, such as in the range of 3 to 30, e.g. 4 to 20 or 5 to 10.

By adjusting the obstructed portion and the non-obstructed portion at the beverage guide, the flow along the beverage guide and/or a pressure in the seat upstream the beverage guide, in particular in the ingredient e.g. within the above capsule (when present), can be controlled. Thereby, the extraction conditions in the seat, in particular in the ingredient, can be adjusted.

The flow control device can thus be used to direct, limit, reduce or stop the beverage flow in, from and out of the extraction seat and through the beverage guide. The control device can operate like a diaphragm with a size and/or position and/or shape adjustable opening aperture for the beverage to flow through and for controlling the flow rate and/or the flow path of the beverage flow. As a consequence, the pressure, the flow path and/or the infusion time can be adjusted in the ingredient.

The control side(s) may include at least one of a circular side, a radial or diametral side, a polygonal side.

The control side(s) can delimit the total flow passage with a cross-section having a shape that is at least one of polygonal, curved e.g. circular, convex or concave, e.g. the shape being a curved or circular sector.

The machine can be configured to operate the obstruction portion and the control side(s) so as to maintain the obstruction portion and the control side(s) stationary relatively to the total guide entry and/or the total guide exit from a beginning to an end of an extraction of such ingredient, e.g. contained with a capsule, in the extraction seat.

The machine may be configured to operate the obstruction portion and the control side(s) so as to move at least one of the obstruction portion and the control side(s) relatively to the total guide entry and/or the total guide exit during an extraction of such ingredient, e.g. within a capsule, in the extraction seat. For instance, the obstruction portion and the control side(s) can be arranged to at least substantially prevent any flow of beverage via the beverage guide during an initial period of extraction of the ingredient and then to be moved to enable a flow of beverage via the beverage guide.

The passage of the flow control device may form in cross-section a substantially circular or annular sector, e.g. generally half disc, such as a substantially circular or annular sector having a circle centre that is at least approximately concentric with a face's circular shape. For instance, the substantially circular or annular sector extends to a circular edge of the face's circular shape. The substantially circular or annular sector may have a central angle in the range of 60 to 300°, such as 90 to 270°, for example 120 to 240°, e.g. 150 to 210°.

The passage of the flow control device may form in cross-section substantially a disc segment. The disc segment may have a disc centre that is at least approximately concentric with a face's shape.

The obstruction portion may include a first sub-portion delimited by one or more first control sides and a second sub-portion delimited by one or more second control sides. The first sub-portion and the second sub-portion may overlap each other.

The first sub-portion and the second sub-portion can be relatively movable, e.g. pivotally and/or linearly movable, to change in size the obstructed portion and the unobstructed portion.

The first sub-portion and the second sub-portion may be movable, e.g. pivotally and/or linearly movable, over the beverage guide structure to change in position the obstructed portion and the unobstructed portion.

The first sub-portion and the second sub-portion can be relatively movable, e.g. pivotally and/or linearly movable, to change in shape the obstructed portion and the unobstructed portion.

The first sub-portion and the second sub-portion may be actuated, manually or automatically e.g. by a motor, independently of each other or may be cinematically coupled to one another. For instance, the first and second sub-portions are driven respectively by a first and second actuatable connector, such as connectors directly or indirectly connected to a handle or a motor.

The first sub-portion and the second sub-portion may be mounted via an axle and a bearing in which the axle is received.

The obstruction portion may include more than two such sub-portions. For instance, a number of sub-portions in the range of 3 to 10, such as 4 to 8, e.g. 5 to 7. The particular features of the first and second sub-portions can be incorporated by analogy in such further sub-portions.

One or more of the first control sides can delimit a first sub-passage and one or more of the second control sides can delimit a second sub-passage, the passage of the flow control device being formed by an intersection of the first and second sub-passages.

The obstruction portion may include a first sub-portion delimited by one or more first control sides and a second sub-portion delimited by one or more second control sides.

For instance, the first sub-portion and the second sub-portion form together the obstruction portion, e.g. the first sub-portion and the second sub-portion overlapping each other.

At least one of the sub-portions may obstruct a fraction of the total guide entry and/or exit of the beverage guide, the fraction being in the range of 20 to 80%, such as 30 to 70%, for instance 40 to 60%, e.g. 45 to 65% of the total guide entry and/or exit.

The obstruction portion may obstruct a fraction of the total guide entry and/or exit, the fraction being in the range of 20 to 90%, such as 30 to 80%, for instance 40 to 70%, e.g. 45 to 60% of the total guide entry and/or exit.

The beverage guide may delimit a plurality of side-by-side beverage passages, such as flow-through holes, each passage having a passage entry and a passage exit, the total guide entry being formed by the passage entries and the total guide exit being formed by the passage exits. The beverage guide may have a number of flow-through holes: in the range of 5 to 15, such as 7 to 13, e.g. 9 to 12; and/or each through hole having a minimum diameter transverse to a beverage outflow direction along the hole, in the range of about 0.1 to 1 mm, such as 0.3 to 0.8 mm, e.g. 0.4 to 0.6 mm.

The extraction seat can be configured to receive the abovementioned capsule containing the ingredient. The face may bear one or more raised elements that project upstream and that are configured for forming one or more beverage outlet openings in the outlet membrane of the capsule in the seat. The raised element(s) may be being fixed relative to and/or integral with the face. The beverage guide may extend from adjacent raised element(s).

The formation of such beverage outlet opening(s) is typically achieved by cutting, tearing and/or breaking the outlet membrane by the raised element(s).

The face can bear a number of the raised element(s) in the range of in the range of 2 to 30, for instance 3 to 20, for example 4 to 15, e.g. 5 to 10.

The machine may include a pressurizer, such as a liquid driver e.g. a pump, configured for driving a carrier liquid, such as water, along the inlet arrangement so as to raise a pressure, e.g. in the range of 5 to 20 bar such as 8 to 15 bar, inside the capsule when in the seat and urge the capsule's outlet membrane towards the raised element(s) so as to form the beverage outlet opening(s) in the outlet membrane.

Self-opening capsules are for instance disclosed in CH 605 293 and WO 03/059778.

The opening of capsules by a machine's piercing elements of a plate is for example disclosed in EP 512 470 and EP 2 068 684.

The machine can include an actuator for mechanically urging the capsule against the face whereby the capsule's outlet membrane is urged towards the raised element(s) so as to form the beverage outlet opening(s) in the outlet membrane.

The machine may be used with capsules having an outlet membrane that is already open when the capsule reaches the seat. For instance, the capsule is manufactured with an open outlet membrane or the outlet membrane is opened at insertion into the seat prior to reaching the seat.

The extraction seat can be configured to receive the abovementioned capsule containing the ingredient. The machine may be used with capsules having an outlet membrane that opens under the effect of pressure without requiring a mechanical opening arrangement external to the capsule. For instance, the opening membrane is provided with weakened areas or the opening membrane is associated with a mechanical opening arrangement, e.g. a piercing and/or cutting and/or tearing arrangement, internal to the capsule.

In such cases, an opening arrangement, such as the above mentioned one or more raised elements, is optional at the dispensing arrangement's face.

The extraction seat can be configured to receive the abovementioned capsule containing the ingredient. The capsule extraction seat may be delimited by a first part and a second part that are relatively movable between: an open position for inserting the ingredient capsule into the extraction seat and/or for removing such capsule from the seat; and a closed position for extracting in the seat the ingredient capsule.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

The first and second parts can be relatively movable by an actuator such as by a user-handle or by an electric motor, e.g. an actuator connected to at least one of the first and second parts by a transmission such as one or more of gears, belts, cams and cam-followers, levers and/or hydraulic transmissions. For instance, such electric motor (when present) is controlled by a control unit for controlling the water supply arrangement. The control unit may include a processing device e.g. a controller and/or a user interface.

Examples of motors implemented to actuate such first and second parts are disclose in EP 1767129, WO 2012/025258, WO 2012/025259, WO 2013/127476, WO 2014/056641, WO 2014/096122, WO 2014/096123, WO 2015/155144 and WO 2015/155145.

The seat's delimiting first part may bear the face. The seat's delimiting second part may bear the inlet arrangement.

One of the first and second parts can be stationary relative to an outside machine housing and the other of the first and second parts can be movable relative to the outside machine housing.

Examples of suitable first and second part arrangements are disclosed in WO 2005/004683, WO2007/135136, WO 2009/043630, WO 2017/037212, WO 2017/037215, PCT/EP18/064138 and PCT/EP18/064141.

The extraction seat can be configured to receive the above mentioned capsule containing the ingredient. The inlet arrangement may be associated with a piercing or cutting arrangement configured to pierce or cut water inlet opening(s) into the ingredient capsule in the ingredient extraction seat so that water circulating along the inlet arrangement is passed into the capsule via the water inlet opening.

The inlet arrangement can be fluidically connected to a water supply arrangement via a water guide.

The water supply arrangement may include at least one of: a water source for supplying water to the inlet arrangement, such as a water tank and/or a connector to an external water supply line; a water driver for driving water to the inlet arrangement, such as a pump; and a thermal conditioner, e.g. a heater and/or a cooler, for thermally conditioning water supplied or to be supplied to the inlet arrangement, such as a water flow thermal conditioner or a water accumulator thermal conditioner.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The water supply arrangement can be associated with a or the abovementioned control unit for controlling the water supply arrangement, such as a control unit comprising a processing device e.g. a controller and/or a user interface.

The capsule extraction seat may be associated with an un-extracted ingredient capsule insertion passage, e.g. extending from outside such machine and leading to the seat, and/or an extracted ingredient capsule evacuation passage, e.g. leading from the seat towards a waste capsule collector. At least one of the passages may be associated with guides such as rails or grooves, for cooperating with and guiding such capsule, e.g. a flange of the capsule, along the passage to and/or from the seat (and/or with a stop for immobilizing such capsule, e.g. at a capsule flange, at about a level of the seat.

Examples of waste ingredient collectors are disclosed in EP 1867260, WO 2009/074559, WO 2009/135869, WO 2010/128109, WO 2011/086087, WO 2011/086088, WO 2017/118713, WO 2017/148965 and EP 2018156589.

The interaction between the first and second parts (and optionally the insertion and/or evacuation passage) and an ingredient capsule may be of the type disclosed in WO 2005/004683, WO 2007/135135, WO2007/135136, WO 2008/037642 and WO 2013/026856.

The insertion passage, when present, may be associated with an ingredient barrier, such as a gate or door or hatch, for selectively allowing and preventing an ingredient pass along the passage. Details of suitable barriers for an ingredient, such as an ingredient supplied within a capsule, are disclosed in WO 2012/126971, WO 2014/056641, WO 2014/056642 and WO 2015/086371.

The control unit can comprise an ingredient sensor such as an ingredient capsule sensor.

Details of suitable capsule sensors are disclosed in WO 2012/123440, WO 2014/147128, WO 2015/173285, WO 2015/173289, WO 2015/173292, WO 2016/005352, WO 2016/005417, PCT/EP18/065613, EP3275345 and EP3275346.

The control unit may incorporate a user-interface, such as a user-interface connected to a or the above control circuit. The user-interface may be of the known type, e.g. as disclosed in WO 2010/037806, WO 2011/020779, WO 2016/083485, WO 2017/037215 and PCT/EP18/064138.

The control unit can have a sensor for sensing a presence of a user-recipient, e.g. a cup or mug, in a or the above area to which beverage from the beverage processing line is dispensed. Such a configuration is for instance disclosed in WO 2018/046400.

The invention also relates to a use of an ingredient capsule for extraction in a machine as described above.

The pressure is typically measured downstream a pump and upstream the water inlet, e.g. in the fluid line between the water inlet and the pump. The pressure in the extraction chamber or in the capsule may possibly be reduced compared to such measured pressure by the presence of a check valve, e.g. at the water inlet of the injection part, and/or restrictions provided in the water inlet of the injection part or by piercing members engaged in the entry wall of the capsule and/or by the ingredient in the capsule and/or other obstacles.

BRIEF DESCRIPTION OF THE DRAWINGS

The invention will now be described with reference to the schematic drawings, wherein.

DETAILED DESCRIPTION

Figure 1:
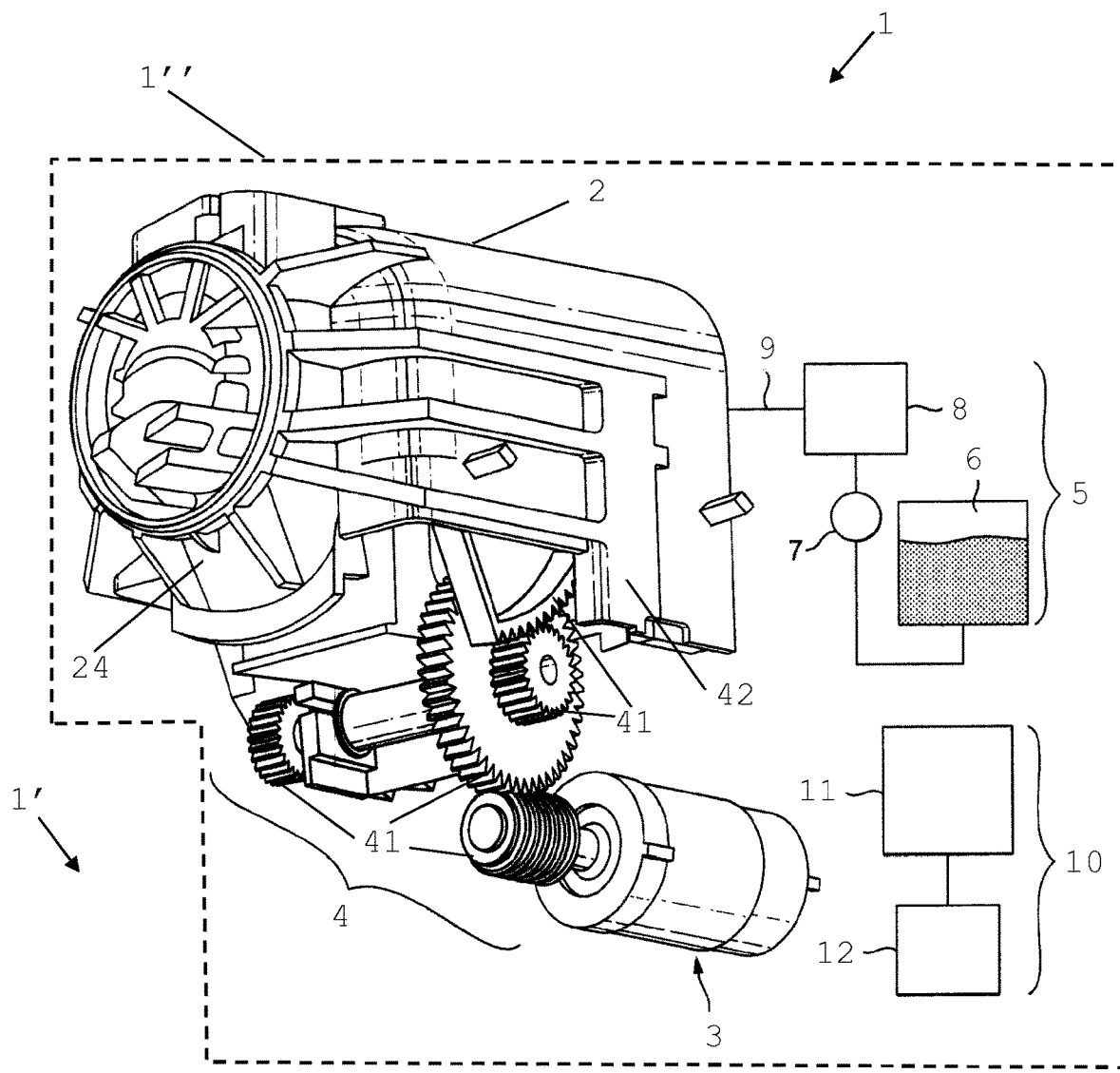
FIG. 1 shows an example of part of a beverage machine according to the invention, part of which being schematically illustrated.
Figure 2:
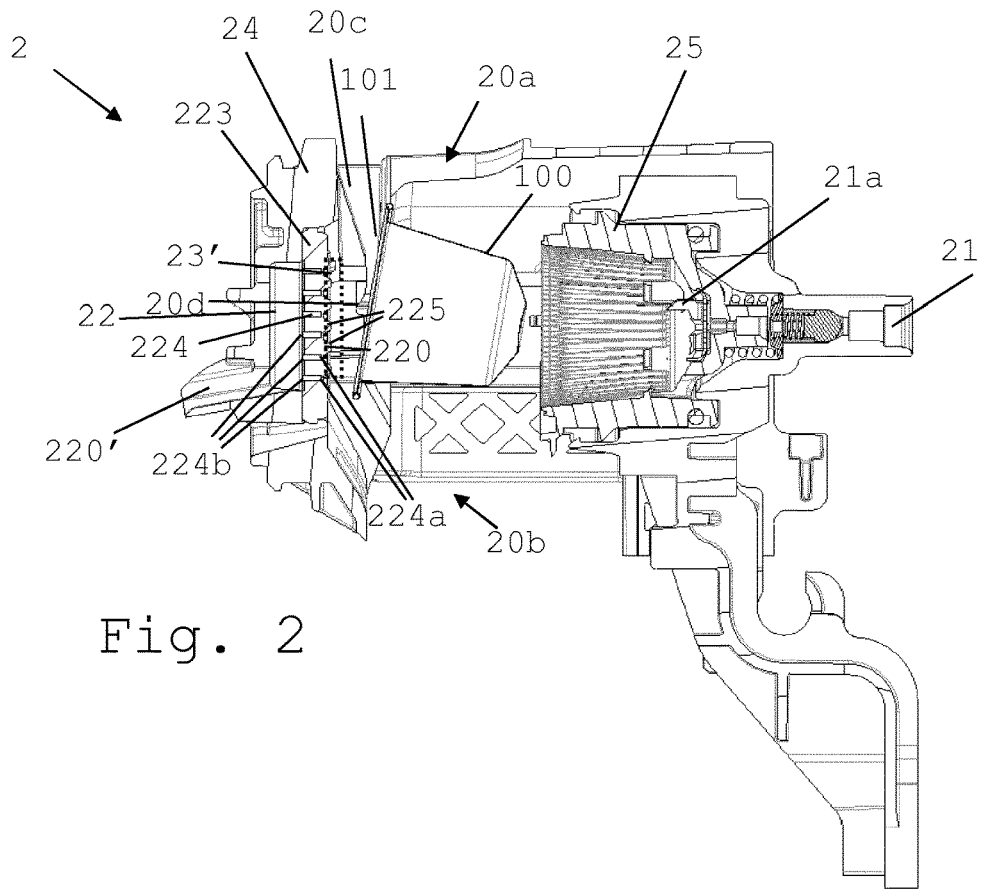
FIG. 2 is a cross-sectional view of an extraction unit of the machine of FIG. 1, an ingredient being in the process of being introduced into the unit's seat that is associated with a flow control device, in accordance with the invention.
Figure 3:
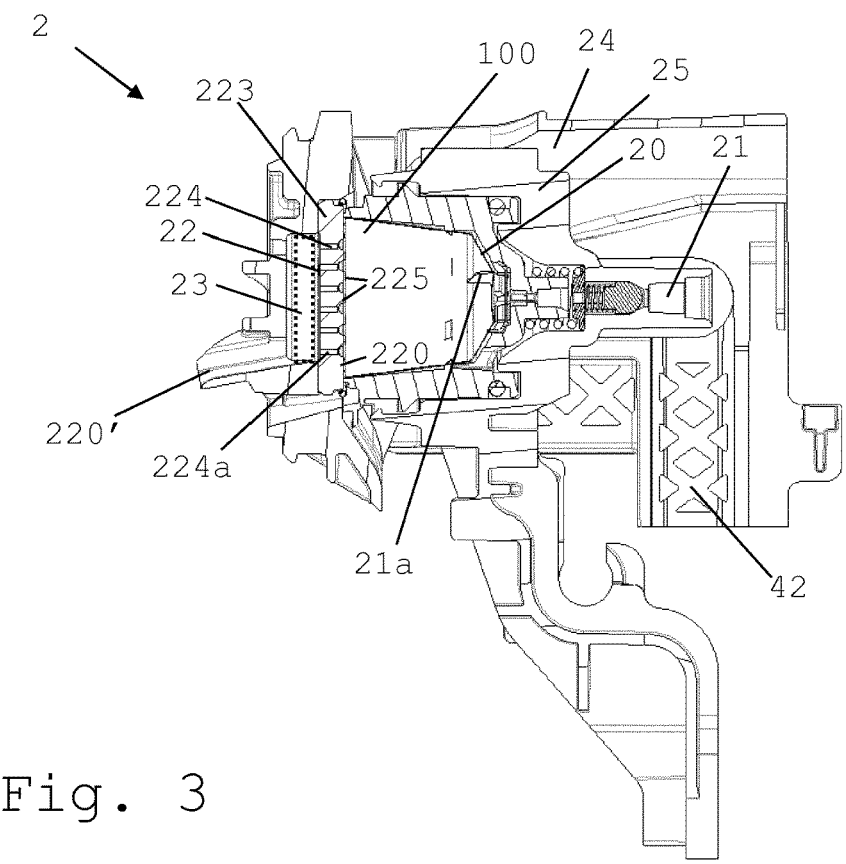
FIG. 3 is a cross-section view of the extraction unit of FIG. 2 with a variation, the ingredient being housed in the seat, ready for extraction.
Figure 4A:
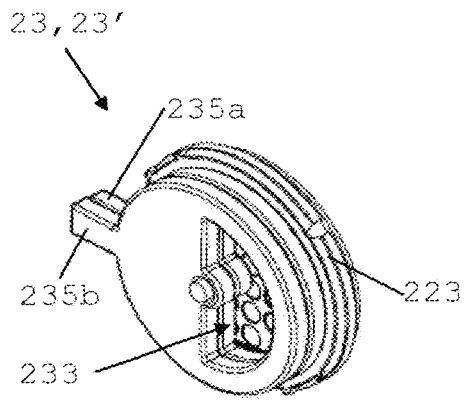
FIGS. 4A to 7 illustrate an example of a flow control device and parts thereof for a machine according to the invention.
Figure 4B:
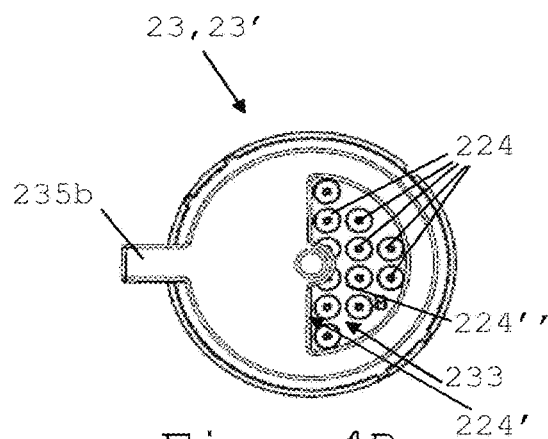
Figure 5A:
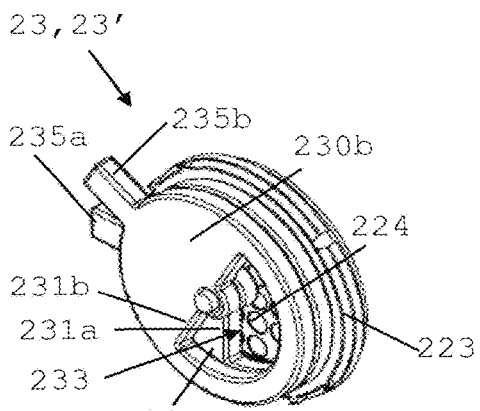
Figure 5B:
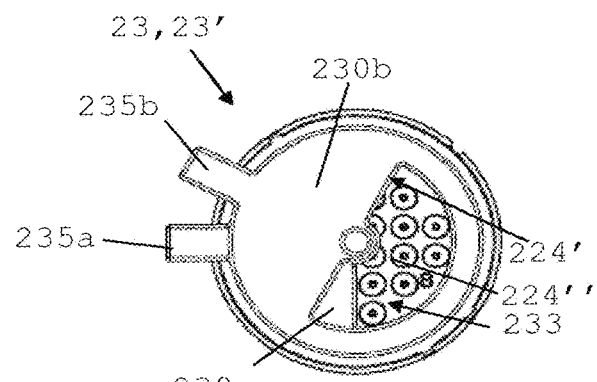
Figure 6:
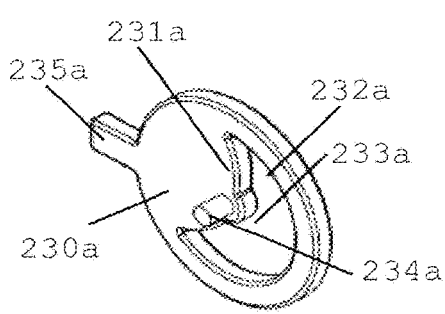

FIGS. 1 to 7 illustrate an exemplary embodiment and variations and parts thereof of a beverage machine 1 for preparing a beverage from an ingredient, such as an ingredient supplied within a capsule 100 that is provided with an outlet membrane 101, according to the invention.

Machine 1 includes an extraction unit 2 that has an extraction seat 20 such as a capsule extraction seat 20, an inlet arrangement 21 for guiding water into seat 20 and a dispensing arrangement 22 for guiding beverage out of seat 20. Dispensing arrangement 22 includes a face 220 delimiting a downstream part of seat 20. Face 220 is formed by a beverage guide structure 223, such as plate-like or sheet-like wall e.g. a disk-like member, having a beverage guide 224 for guiding a total flow of beverage from seat 20 via a total guide entry 224a, through beverage guide structure 223, out of a total guide exit 224b towards a dispensing area 1' via a beverage outlet 220'. The dispensing area may be delimited by a support for supporting a user-recipient. Beverage guide structure 223 is associated with a flow control device 23,23' configured to control the flow of beverage guided along beverage guide 224. Beverage guide 224 may be formed of at least one of: flow-through passages formed by a reticulated and/or foraminate and/or porous structure; and one or more flow-through holes. See FIGS. 1 to 3.

Flow control device 23,23' has an obstruction portion 230a,230b, such as a portion that is at least substantially beverage impervious, extending adjacent beverage guide structure 223 so as to obstruct at least a portion 224' (FIG. 5) of total guide entry 224a (FIG. 2) and/or total guide exit 224b (FIG. 3) to prevent or inhibit the passage of beverage through such obstructed guide portion 224'.

Flow control device 23,23' has one or more control sides 231a,232a,231b,232b suitable to delimit from obstruction portion 230a,230b a passage 233 through which is passed the total flow of beverage passing through a non-obstructed portion 224" of total guide entry and/or exit 224a,224b, non-obstructed portion 224" being adjacent obstructed portion 224'. See FIGS. 4 to 5a.

Obstruction portion 230a,230b and control side(s) 231a, 232a,231b,232b are operable over beverage guide structure 223 so as to change a relative position and/or a relative size and/or a shape of obstructed portion 224' and unobstructed portion 224" of total guide entry and/or exit 224a,224b. See FIGS. 2 to 5a. Obstruction portion 230a,230b and control side(s) 231a,232a,231b,232b may be operable over the beverage guide structure 223 to be selectively brought into a number of different configurations in terms of relative size and/or relative position and/or shape, for instance a number of at least two, such as in the range of 3 to 30, e.g. 4 to 20 or 5 to 10.

Control side(s) 231a,232a,231b,232b may comprise at least one of a circular side 232a,232b, a radial or diametral side 231a,231b, a polygonal side 321a,321. See FIGS. 4 to 7.

Control side(s) 231a,232a,231b,232b may delimit passage 233 with a cross-section having a shape that is at least one of polygonal, curved e.g. circular, convex or concave, e.g. the shape being a curved or circular sector. See FIGS. 4 to 7.

Machine 1 may be configured to operate obstruction portion 230a,230b and control side(s) 231a,232a,231b,232b so as to maintain obstruction portion 230a,230b and control side(s) 231a,232a,231b,232b stationary relatively to total guide entry 224a and/or total guide exit 224b from a beginning to an end of an extraction of an ingredient, e.g. within capsule 100, in extraction seat 20.

Machine 1 may be configured to operate obstruction portion 230a,230b and control side(s) 231a,232a,231b,232b so as to move at least one of obstruction portion 230a,230b and control side(s) 231a,232a,231b,232b relatively to total guide entry 224a and/or total guide exit 224b during an extraction of an ingredient, e.g. within capsule 100, in extraction seat 20. Obstruction portion 230a,230b and control side(s) 231a,232a,231b, 232b may be arranged to at least substantially prevent any flow of beverage via beverage guide 224 during an initial period of extraction of ingredient, e.g. within capsule 100, and then to be moved to enable a flow of beverage via beverage guide 224.

Figure 7:
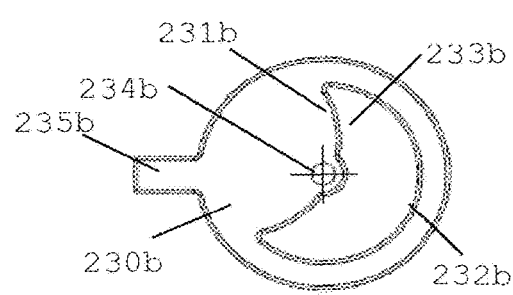

Obstruction portion 230a,230b may include a first sub-portion 230a delimited by one or more first control sides 231a,232a (FIG. 6) and a second sub-portion 230b delimited by one or more second control sides 231b,232b (FIG. 7). First sub-portion 230a and second sub-portion 230b may overlap each other. See FIGS. 4 to 7.

First sub-portion 230a and second sub-portion 230b can be relatively movable, e.g. pivotally and/or linearly movable, to change in size obstructed portion 224' and unobstructed portion 224". See FIGS. 4 to 5a.

First sub-portion 230a and second sub-portion 230b may be movable, e.g. pivotally and/or linearly movable, over beverage guide structure 223 to change in position obstructed portion 224' and unobstructed portion 224". See FIGS. 4 to 5a.

First sub-portion 230a and second sub-portion 230b can be relatively movable, e.g. pivotally and/or linearly movable, to change in shape obstructed portion 224' and unobstructed portion 224". See FIGS. 4 to 5a.

First sub-portion 230a and second sub-portion 230b may be actuated, manually or automatically e.g. by a motor, independently of each other or being cinematically coupled to one another. First and second sub-portions 230a,230b can be driven respectively by a first and second actuatable connector 235a,235b, such as connectors directly or indirectly connected to a handle or a motor. See FIGS. 4 to 7.

First sub-portion 230a and second sub-portion 230b can be mounted via an axle 234a and a bearing 234b in which axle 234a is received. See FIGS. 4 to 7.

Obstruction portion may include more than two such sub-portions 230a,230b, for instance a number of sub-portions in the range of 3 to 10, such as 4 to 8, e.g. 5 to 7.

One or more first control sides 231a,232a may delimit a first sub-passage 233a and one or more second control sides 231b,232b may delimit a second sub-passage 233b. Passage 233 of flow control device 23,23' can be formed by an intersection of first and second sub-passages 233a,233b.

Obstruction portion 230a,230b may include a first sub-portion 230a delimited by one or more first control sides 231a,232a and a second sub-portion 230b delimited by one or more second control sides 231b,232b. For instance, first sub-portion 230a and second sub-portion 230b form together obstruction portion 230a,230b. First sub-portion 230a and second sub-portion 230b may overlap each other.

At least one of sub-portions 230a,230b may obstruct a fraction of total guide entry and/or exit 224a,224b of beverage guide 224, the fraction being in the range of 20 to 80%, such as 30 to 70%, for instance 40 to 60%, e.g. 45 to 65% of the total guide entry and/or exit 224a,224b.

Obstruction portion 230a,230b can obstruct a fraction of total guide entry and/or exit 224a,224b, the fraction being in the range of 20 to 90%, such as 30 to 80%, for instance 40 to 70%, e.g. 45 to 60% of total guide entry and/or exit 224a,224b.

Beverage guide 224 may delimit a plurality of side-by-side beverage passages, such as flow-through holes, each passage having a passage entry and a passage exit, total guide entry 224a being formed by the passage entries and total guide exit 224b being formed by passage exits.

Beverage guide 224 can have a number of flow-through holes 224: in the range of 5 to 15, such as 7 to 13, e.g. 9 to 12; and/or each flow-through hole 224 having a minimum diameter transverse to a beverage outflow direction along the hole, in the range of about 0.1 to 1 mm, such as 0.3 to 0.8 mm, e.g. 0.4 to 0.6 mm.

Extraction seat 20 can be configured to receive the abovementioned capsule 100 containing the ingredient. Face 220 may bear one or more raised elements 225 that project upstream and that are configured for forming one or more beverage outlet openings in outlet membrane 101 of capsule 100 in seat 20. Raised element(s) 225 may be fixed relative to and/or integral with face 220. Beverage guide 224 may extend from adjacent raised element(s) 225. Face 220 may bear a number of the raised element(s) in the range of in the range of 2 to 30, for instance 3 to 20, for example 4 to 15, e.g. 5 to 10.

Inlet arrangement 21 can be associated with a pressurizer, such as a liquid driver e.g. a pump 7, configured for driving a carrier liquid, such as water, along the inlet arrangement 21 so as to raise a pressure, e.g. in the range of 5 to 20 bar such as 8 to 15 bar, inside capsule 100 when in seat 20 and urge outlet membrane 101 towards raised element(s) 225 so as to form beverage outlet opening(s) in outlet membrane 101.

Seat 20 may be associated with an actuator for mechanically urging capsule 100 against face 220 whereby outlet membrane 101 is urged towards raised element(s) 225 so as to form beverage outlet opening(s) in outlet membrane 101.

In a variation (slightly diverging from the embodiment shown in FIGS. 2 and 3 as to reference 225), face 220 can be free of any raised element forming an outlet opening in capsule's outlet membrane 101, seat 20, being configured to receive capsule 100 with an outlet membrane 101 that is opened prior to reaching seat 20 and/or that opens in seat 20 without the aid of a raised element, e.g. by having a capsule internal membrane mechanical opener and/or by having weakened areas in membrane 101 that are torn and/or broken open under a pressure rise in capsule 100.

Extraction seat 20 can be configured to receive capsule 100 containing the ingredient. Extraction seat 20 can be delimited by a first part 24 and a second part 25 that are relatively movable between: an open position for inserting capsule 100 into extraction seat 20 and/or for removing such capsule 100 from seat 20; and a closed position for extracting in seat 20 ingredient capsule 100. See FIGS. 2 and 3.

First and second parts 24,25 can be relatively movable by an actuator such as by a user-handle or by an electric motor 3, e.g. an actuator connected to at least one of first and second parts 24,25 by a transmission 4 such as one or more of gears 41, belts, cams 42 and cam-followers, levers and/or hydraulic transmissions. For instance such electric motor 3 (when present) is controlled by a control unit 10 for controlling water supply arrangement 5, such as a control unit 10 having a processing device e.g. a controller 11 and/or a user interface 12. See FIGS. 1 to 3.

First part 24 may bear face 220 and second part 25 may bear inlet arrangement 21. See FIGS. 2 and 3.

One of first and second parts 24,25 can be stationary relative to an outside machine housing 1" and the other of first and second parts 24,25 can be movable relative to outside machine housing 1".

Extraction seat 20 can be configured to receive capsule 100 containing the ingredient. Inlet arrangement can be associated with a piercing or cutting arrangement 21a configured to pierce or cut water inlet opening(s) into ingredient capsule 100 in the ingredient extraction seat 20 so that water circulating along inlet arrangement 21 is passed into capsule 100 via the water inlet opening. See FIGS. 2 and 3. Inlet arrangement 21 can be fluidically connected to a water supply arrangement 5 via a water guide 9.

Water supply arrangement 5 may include at least one of: a water source 6 for supplying water to inlet arrangement 21, such as a water tank and/or a connector to an external water supply line; a water driver 7 for driving water to inlet arrangement 21, such as a pump; and a thermal conditioner 8, e.g. a heater and/or a cooler, for thermally conditioning water supplied or to be supplied to inlet arrangement 21, such as a water flow thermal conditioner or a water accumulator thermal conditioner. See FIGS. 1 to 3.

Water supply arrangement 5 may be associated with a or the above mentioned control unit 10 for controlling water supply arrangement 5, such as a control unit 10 having a processing device e.g. a controller 11 and/or a user interface 12.

Capsule extraction seat 20 may be associated with an un-extracted ingredient capsule insertion passage 20a, e.g. extending from outside such machine 1 and leading to seat 20, and/or an extracted ingredient capsule evacuation passage 20b, e.g. leading from seat 20 towards a waste capsule collector. For instance, at least one of passages 20a,20b is/are associated with guides 20c such as rails or grooves, for cooperating with and guiding capsule 100 along passage to and/or from seat 20 and/or with a stop 20d for immobilizing capsule 100 at about a level of seat 20. See FIGS. 2 and 3.

The invention claimed is:

1. A method for extracting a beverage from an ingredient supplied within a capsule in a machine, the machine comprising an extraction unit that has an extraction seat, the method comprising:
    receiving, in the extraction seat, the capsule containing the ingredient, wherein the extraction seat is delimited by a first part and a second part that relatively move between (i) an open position for at least one of inserting the capsule into the extraction seat and for removing the capsule from the extraction seat and (ii) a closed position for extracting the capsule in the extraction seat;
    guiding, by an inlet arrangement, water into the extraction seat; and
    guiding, by a dispensing arrangement, the beverage out of the extraction seat towards a dispensing area via a beverage outlet, the dispensing arrangement comprising:
        a face delimiting a downstream part of the extraction seat, the face being formed by a beverage guide structure having a beverage guide for guiding a total flow of beverage from the extraction seat via a total guide entry, through the beverage guide structure, out of a total guide exit towards the dispensing area via the beverage outlet, the beverage guide structure being associated with a flow control device configured to control the total flow of beverage guided along the beverage guide, the flow control device has:

an obstruction portion, extending adjacent the beverage guide structure to obstruct at least a portion of the total guide entry and/or total guide exit to prevent or inhibit the passage of beverage through an obstructed guide portion, and one or more control sides to delimit from the obstructed guide portion a passage through which is passed the total flow of beverage passing through a non-obstructed portion of the total guide entry and/or the total guide exit, the non-obstructed portion being adjacent the obstructed guide portion, the obstruction portion and the one or more control sides being operable over the beverage guide structure to change a position and/or a size and/or a shape of the obstructed portion and the unobstructed portion of the total guide entry and/or the total guide exit.

2. The method of claim 1, further comprising controlling the total flow of beverage guided along the beverage guide, wherein the machine operates the obstruction portion and the one or more control sides to:

maintain the obstruction portion and the one or more control sides stationary relatively to the total guide entry and/or the total guide exit from a beginning to an end of an extraction of the ingredient; and/or move at least one of the obstruction portion and the one or more control sides relatively to the total guide entry and/or the total guide exit during an extraction of the ingredient.

3. The method of claim 1, wherein the obstruction portion of the machine comprises a first sub-portion delimited by one or more first control sides and a second sub-portion delimited by one or more second control sides.

4. The method of claim 3, further comprising obstructing, by at least one of the first sub-portion or the second sub-portion, a fraction of the total guide entry and/or the total guide exit of the beverage guide, the fraction being in the range of 20 to 80% of the total guide entry and/or the total guide exit.

5. The method of claim 1, further comprising obstructing, by the obstruction portion, a fraction of the total guide entry and/or the total guide exit, the fraction being in the range of 20 to 90% of the total guide entry and/or the total guide exit.

6. The method of claim 1, further comprising delimiting, by the beverage guide, a plurality of side-by-side beverage passages, each of the passages having a passage entry and a passage exit, the total guide entry being formed by the passage entries, and the total guide exit being formed by the passage exits.

7. The method of claim 1, wherein the receiving, in the extraction seat, the capsule containing the ingredient includes forming one or more beverage outlet openings in an outlet membrane of the capsule, wherein the face is bearing one or more raised elements that project upstream and that form one or more beverage outlet openings in the outlet membrane of the capsule in the seat, the one or more raised elements being fixed relative to and/or integral with the face.

8. The method of claim 1, wherein the receiving, in the extraction seat, the capsule containing the ingredient includes forming an outlet opening in an outlet membrane of the capsule, the face being free of any raised element forming an outlet opening in the outlet membrane of the capsule, the extraction seat receives the capsule with the outlet membrane being opened prior to reaching the extraction seat and/or the outlet membrane being opened in the extraction seat without aid of any raised element.

9. The method of claim 1, wherein the guiding, by the dispensing arrangement, the beverage out of the extraction seat towards the dispensing area via the beverage outlet includes delimiting the extraction seat by the first and second parts, wherein the first part and the second part move by an actuator; and/or the first part bearing the face and the second part bearing the inlet arrangement; and/or one of the first and second parts being stationary in relation to an outside machine housing and the other of the first part and the second part move in relation to the outside machine housing.

10. The method of claim 1, further comprising piercing or cutting a water inlet opening into the capsule, wherein the inlet arrangement is (a) associated with a piercing or cutting arrangement that pierces or cuts the water inlet opening into the ingredient capsule in the extraction seat so that water circulating along the inlet arrangement is passed into the capsule via the water inlet opening and/or (b) fluidically connected to a water supply arrangement via a water guide.

11. The method of claim 10, further comprising supplying water from the water supply arrangement to the inlet arrangement, wherein the water supply arrangement comprises at least one of: a water source for supplying water to the inlet arrangement; a water driver for driving water to the inlet arrangement, and a thermal conditioner.

* * * * *